(12) United States Patent
Park

(10) Patent No.: US 11,999,555 B2
(45) Date of Patent: Jun. 4, 2024

(54) CONTAINER FOR BEVERAGE

(71) Applicant: Jong Pyo Park, Bucheon-si (KR)

(72) Inventor: Jong Pyo Park, Bucheon-si (KR)

(73) Assignees: IN MOTION DESIGN INC., Paramount, CA (US); MOLD LINE CO., LTD, Incheon (KR); Jong Pyo Park, Bucheon-si (KR)

( * ) Notice: Subject to any disclaimer, the term of this patent is extended or adjusted under 35 U.S.C. 154(b) by 0 days.

(21) Appl. No.: 17/565,173

(22) Filed: Dec. 29, 2021

(65) Prior Publication Data
US 2022/0258953 A1 Aug. 18, 2022

(30) Foreign Application Priority Data
Feb. 18, 2021 (KR) .................. 10-2021-0021717

(51) Int. Cl.
B65D 83/20 (2006.01)
A23F 5/24 (2006.01)
A23L 2/54 (2006.01)

(52) U.S. Cl.
CPC ............ B65D 83/205 (2013.01); A23F 5/243 (2013.01); A23L 2/54 (2013.01); A23V 2002/00 (2013.01)

(58) Field of Classification Search
CPC ...... B65D 83/205; B65D 83/40; B65D 83/14; B65D 85/72; B65D 83/20; A23F 5/243; A23L 2/54; A23V 2002/00
See application file for complete search history.

(56) References Cited

U.S. PATENT DOCUMENTS

| 3,361,301 A | * | 1/1968 | Meshberg | B65D 83/205 |
| | | | | D9/449 |
| 4,174,055 A | * | 11/1979 | Capra | B05B 9/0883 |
| | | | | 222/340 |
| 2009/0039114 A1 | * | 2/2009 | Yamamoto | B65D 83/303 |
| | | | | 222/402.11 |

FOREIGN PATENT DOCUMENTS

| EP | 0455552 | * | 11/1991 |
| JP | 2509214 B2 | * | 6/1996 |
| JP | H11128776 | * | 5/1999 |
| JP | 2008062974 | * | 3/2008 |
| JP | 2016060496 | * | 4/2016 |
| KR | 30-1027620 | | 10/2019 |
| KR | 30-1027622 | | 10/2019 |
| KR | 30-1027626 | | 10/2019 |
| KR | 30-1027627 | | 10/2019 |
| KR | 30-1027628 | | 10/2019 |
| KR | 30-1027630 | | 10/2019 |

* cited by examiner

Primary Examiner — Bob Zadeh
(74) Attorney, Agent, or Firm — PARK LAW FIRM

(57) ABSTRACT

A container for beverage has a container body and a pressing member. The pressing member has a pair of guide grooves concavely formed to guide the user's fingers on two sides of the outer surface of the pressing member. The pressing member has a discharge hole positioned facing a nozzle from the container body so that the beverage contained in the container discharges through the nozzle and through the discharge hole when the pressing member is pressed towards the container body. The container body is ideal for containing coffee and pressurized gas to eject the coffee into a cup for enjoyment.

6 Claims, 8 Drawing Sheets

FIG. 8A
FIG. 8B
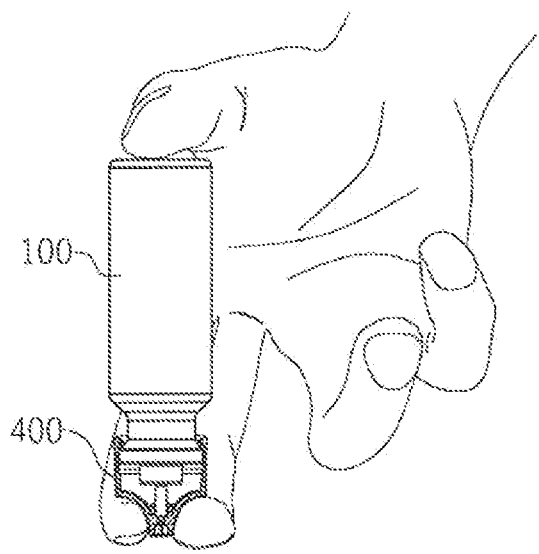
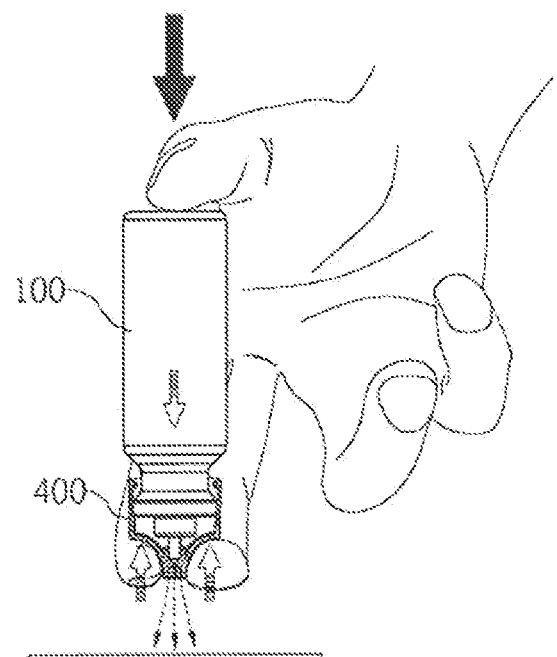
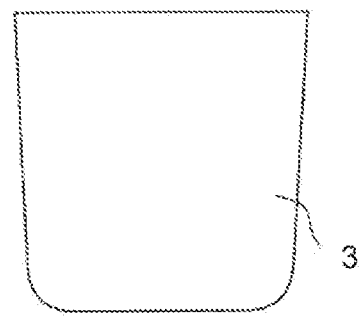
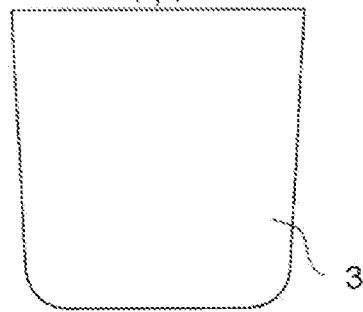

CONTAINER FOR BEVERAGE

This application claims foreign priority of a Korean patent application 10-2021-0021717 (the "'717 Application") with the filing date of Feb. 18, 2021. The entire content of the '717 Application is hereby incorporated by reference.

SUMMARY

An improved container, more specifically a gas-filled pressurized container for containing liquid, is presented herein. The gas-filled pressurized container allows the liquid to be easily jettison out from the container.

Coffee is a favorite beverage enjoyed around most of the world, after harvesting green beans from coffee trees, processing them, roasting them, mixing one or more different variety of coffee beans, and extracting it. There are various methods in extracting coffee, including but not limited to, immersion method, filter filtration method, vacuum filtration method, pressure extraction method, and the like.

Immersion is a method of brewing in water at room temperature, cold or hot water. Filter filtration is a method of extracting coffee by pouring hot water on the filter containing coffee powder; extraction containers are used such as drip-coffee machines or hand drip. Vacuum filtration is using steam pressure and It is a method of extraction using the osmotic pressure of water. The pressure extraction method is a method of rapidly extracting soluble components by passing hot water through the coffee layers under pressure.

Meanwhile, as consumers become more experts in coffee making, the consumers increasingly want higher-quality coffee. As a result, cold-brew coffee, which retains its flavor longer, stays fresh longer and distributes more conveniently than other coffees, is gaining popularity. Although there is no known orthodox history on or the origin of cold brew coffee, it is generally known that it is a method devised by sailors for drinking coffee on board while transporting Dutch Indonesian Robusta coffee to Europe.

Recently, nitro coffee, the smooth texture, foam created and flavor of which can be enjoyed for a long time by mixing cold brew coffee with nitrogen like draft beer, is becoming increasingly popular. In the case of nitro coffee, a high-pressure nitrogen filling device is required to inject nitrogen into cold brew coffee, so there is a limit to consumers making and drinking it themselves. Accordingly, in order to enjoy nitro coffee conveniently by consumers, a beverage container filled with liquid beverages such as coffee and high-pressure nitrogen gas has been developed.

FIG. 1 shows a view a beverage container filled with conventional nitro coffee. Referring to FIG. 1, the conventional beverage container filled with nitro coffee is a pressure container 10 filled with high-pressure compressed nitrogen and liquid coffee, and a fixing cap. The user holds the pressure container over a cup, with the fixing cap 20 and the pressure vessel 10 turned upside down, while holding the fixing cap 20 with the little finger. From this position, the user presses the pressure vessel with a thumb (10), by lowering and pressing the thumb down on the pressure vessel in the direction of the fixing cap (20). The discharge pipe within the pressure vessel (10) is then pressed and opened to eject the liquid beverage accommodated in the pressure vessel (10) through a discharge hole of the fixed cap (20).

In this configuration, because the user has to support the fixing cap 20 with his or her pinky finger, it is difficult for the user to press the pressure vessel 10 with the thumb, especially a weak pinky finger holding the fixing cap.

Therefore, the present invention strives to solve the problems of the prior art as described and provide a nitro beverage container that allows the beverage accommodated in the container body to be easily sprayed to the outside.

Thus, the improved container described in this application is a nitro beverage container having a container body in which a beverage solution and gas are accommodated. The improved container also has a lid closing the open end of the container body and a nozzle penetrating through the lid. A housing has a space formed therein to accommodate the lid and the nozzle, and a pair of guide grooves concavely formed to guide the user's fingers on both sides of the outer surface of the housing located in the opposite direction of the lid, and the housing; It provides a nitro beverage container, characterized in that it includes a pressing member having a discharge hole formed to face the nozzle between the both sides of the outer surface of the penetrating discharge hole smaller diameter than the nozzle.

In addition, the housing includes a pressing surface portion positioned in the opposite direction of the lid, and a side wall portion formed in a columnar shape along an edge of the pressing surface portion, and the guide groove is in a direction closer to each other from both sides of the side wall portion. A first guides formed, and a second guide formed in a concave arc shape toward the center direction of the pressing surface of the first guide and second guide opposite to each other, wherein the inner side of the user's first finger is mounted on the first guide part and the inner side of the user's second finger is mounted on the second guide part. One of the benefits of the nitro beverage container is that the fingers of the user are comfortably placed on the first guide part and the second guide part to press the housing comfortably while holding the container body with the hand.

In addition, a convex portion is formed to protrude in the direction of the nozzle at the center of the inner surface of the housing positioned to face the nozzle, and a concave engaging guide groove is formed on the opposite side the convex portion. The discharge hole is formed at the center of the engaging guide groove.

The end of the nozzle is positioned to be placed near the edge of the engaging guide groove. The sliding part is inclined along the inner peripheral end of the engaging guide groove facing the so that the nozzle may be inserted into the engaging guide groove. The end of the nozzle is guided in the direction of the engaging guide groove after sliding along the sliding portion.

In addition, a discharge guide groove is formed at the center of the outer surface of the housing opposite to the nozzle in the direction of the discharge hole. The discharge hole is integral with the center of the discharge guide groove and the discharge hole is formed through so that the beverage solution and gas are discharged through the discharge hole, guided along the discharge guide groove and discharged into a cup.

In addition, the housing includes a pressing surface portion positioned in the opposite direction of the lid. A side wall portion formed in a columnar shape along an edge of the pressing surface portion, and an inner peripheral end of the side wall portion located in the opposite direction of the pressing surface portion.

A locking portion protrudes from the inside of the side wall portion. When the pressure is applied to the guide groove, the lid moves over the locking portion towards a stopper. The lid and an upper portion of the container body is securely held between the stopper and the locking portion of the housing.

In addition, one end of the container body, that the lid closes, includes a container top positioned at the longitudinal end of the container body, and a container side part located on the longitudinal side of the container body connected to the edge of the container top.

A plurality of fastening protrusions are formed along the circumference of the container top, a plurality of fastening grooves are formed along the outer periphery of the container side. A lid is coupled to cover one end of the container body, the container side of the lid covering the wall portion is formed to cover the inner skin of an elastic material. The fastening protrusions are positioned to be embedded in the inner skin, and the other side of the lid covering the container side is inserted into the binding groove.

One of the benefits of the container described herein is that the fingers are stably placed in the pair of guide grooves; thus, the fingers can stably press the housing in the direction of the container body while the hand (fingers) holds the container body. Alternately the fingers are stably placed in the pair of guide grooves to stably press the housing into the direction of the container body against the palm of the hand. Moreover, because the guide groove is configured not to protrude from either side of the container body, there is an excellent effect of portability.

In addition, because the lid is caught between the locking part and the stopper, the pressing member is not arbitrarily removed from the container body after the use. Because of it, there is no need to carry the pressing member separately for use or for disposal; thereby making it easy to carry, store and dispose.

In addition, because the direction in which the beverage solution and nitrogen gas are discharged through the discharge hole is guided along the discharge guide groove, the beverage solution and nitrogen gas discharged through the discharge hole are not sprayed in all directions or splattered, but follow a preset path, ensuring accurate discharge of the beverage, following the stream of discharging gas.

In addition, in the process in which the lid is coupled to the container body, the fastening protrusion is configured to be firmly embedded in the inner skin and the insertion protrusion is inserted into the binding groove, the lid is firmly and tightly coupled to the container body. The container body accommodates the storing and releasing of the high-pressure gas contained within.

BRIEF DESCRIPTION OF THE DRAWINGS

These and other features, aspects and advantages of the container will become better understood with reference to the accompanying drawings, wherein:

FIG. 8A is an illustration of the nitro beverage container held in a hand prior to discharge of liquid and gas; and FIG. 8B is an illustration of the nitro beverage container squirting liquid and gas as the pressing member is pressed toward the container body by the fingers.

DETAILED DESCRIPTION

Figure 1:
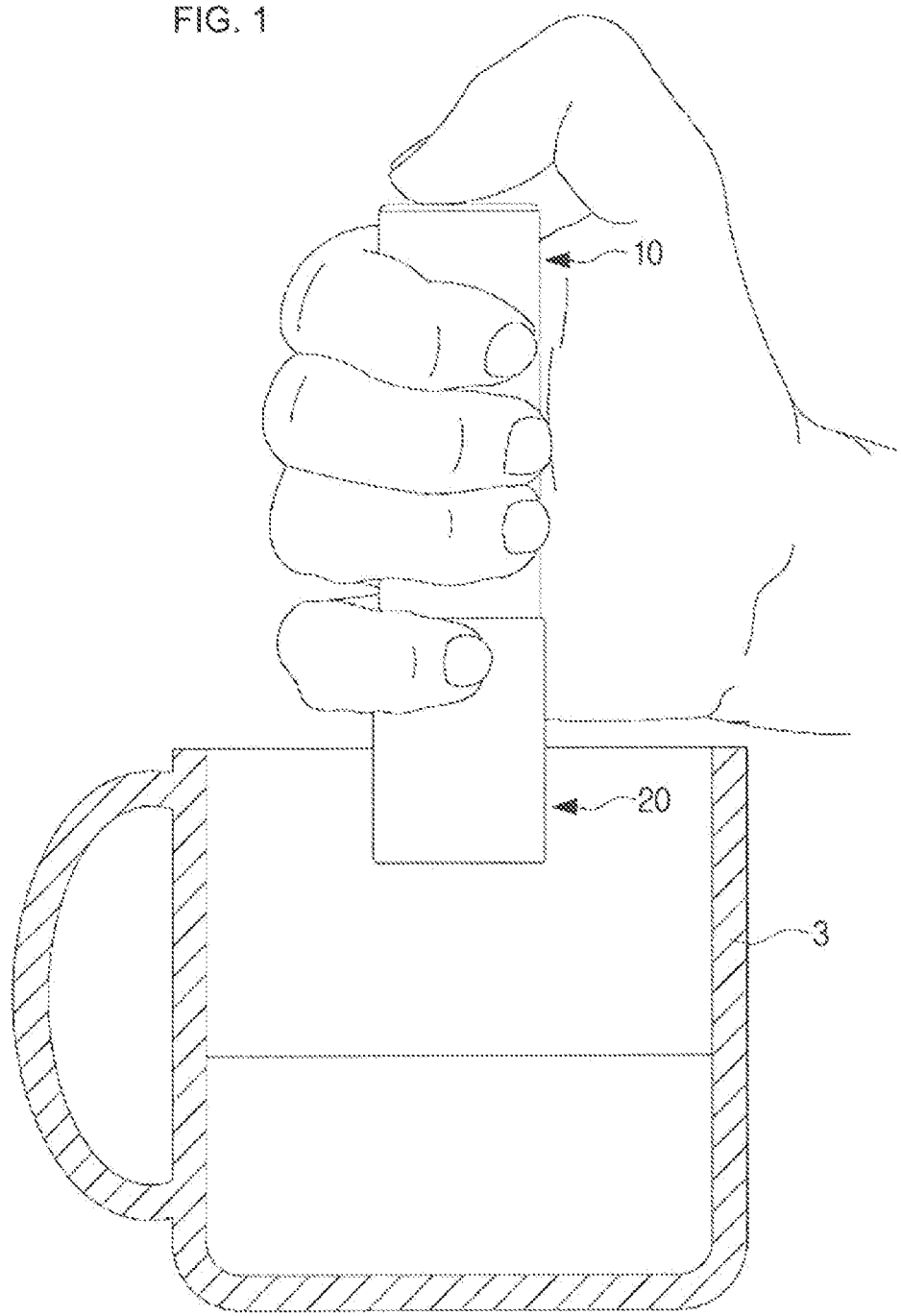
FIG. 1 shows a prior art beverage container filled with nitro coffee.

An improved container is described in detail as shown on the Figs. FIG. 1 shows a prior art beverage container filled with nitro coffee. This prior art configuration has inherent difficulty in holding the pressure container 10 in the palm while using the pinky (the weakest finger) to hold the fixed cap 20 and pressing the end of the pressure container 10 with a thumb to discharge the beverage.

Figure 2:
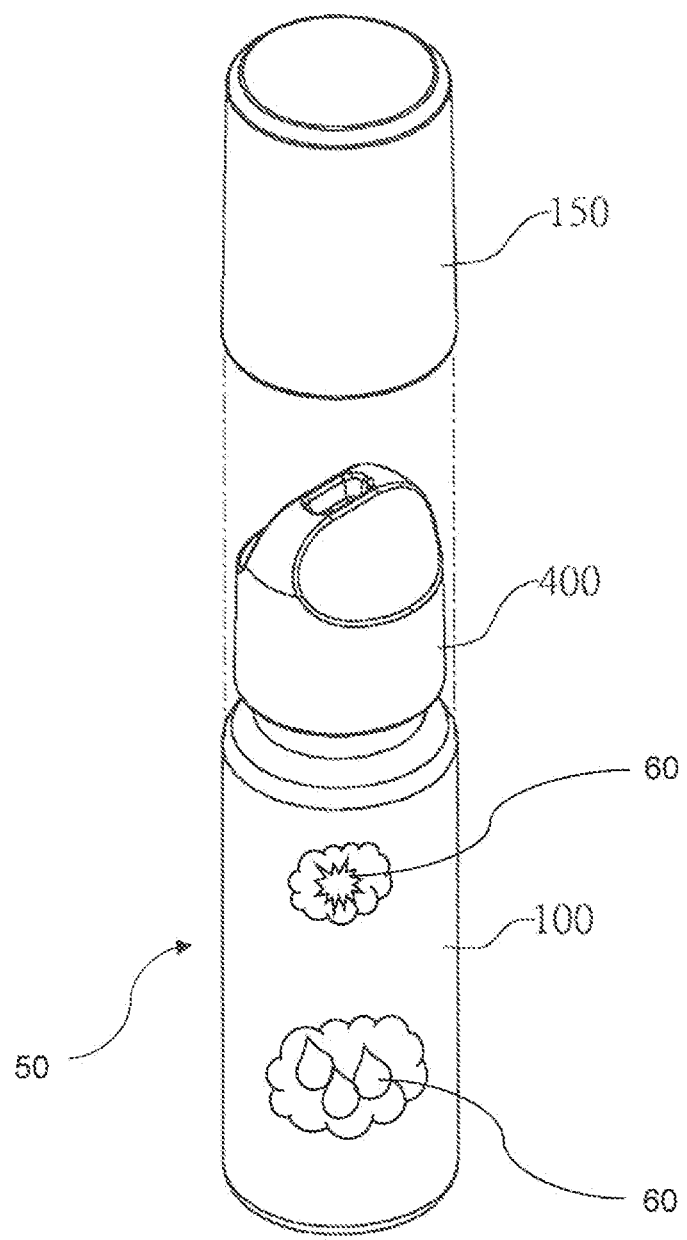
FIG. 2 shows a preferred embodiment of the nitro beverage container.
Figure 3:
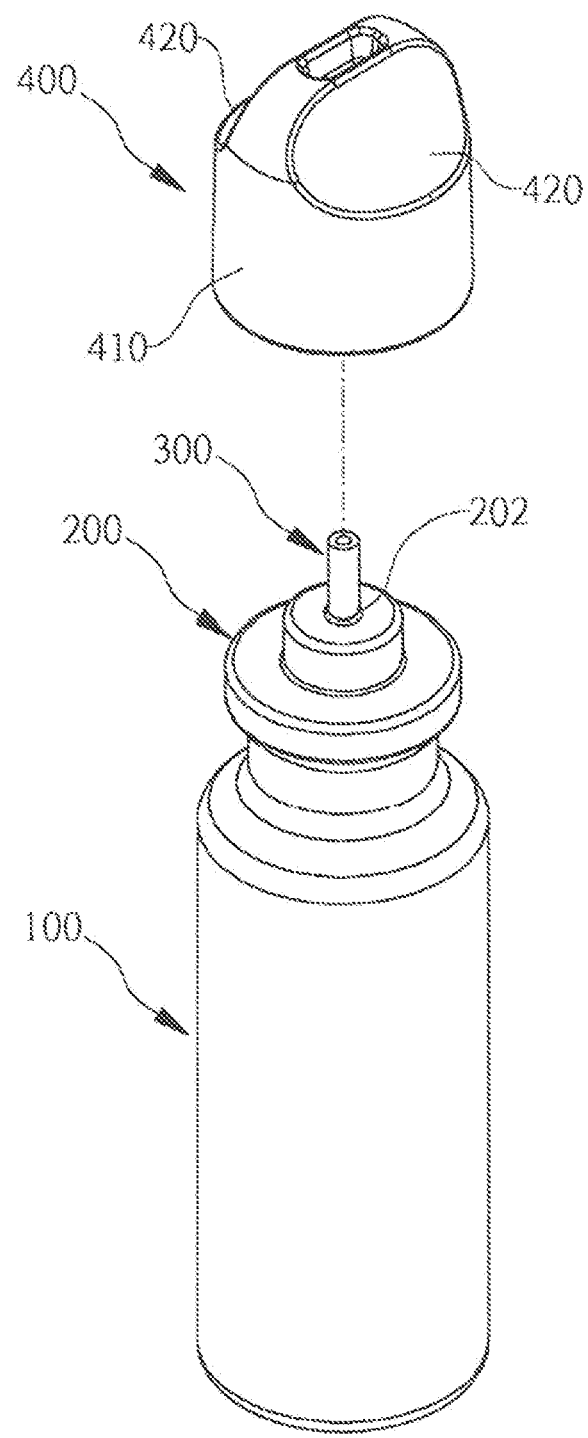
FIG. 3 shows a pressing member of the nitro beverage container separated from the container body.

FIG. 2 shows a view of a nitro drink container 50. The pressing member 400 is attached to the container body 100, with a cap 150 shown above the nitro drink container 50 to show the details of the pressing member 400. FIG. 3 shows the pressing member 400 separated from the container body 100 to show the details of the upper portion of the container body 100.

FIGS. 2 and 3 show the nitro beverage container system 1000 with the container body 100, the pressing member and a cap 150. The container 50 has the container body 100, a lid 200, a nozzle 300, a pressing member 400. The container body 100 contains a beverage 55 and a pressured gas 60. The preferred pressurized gas is nitrogen.

The container body 100 is formed in a long bottle shape and has a size that can be easily gripped by a user by hand. The container body 100 may be formed of a transparent material so that the contents inside can be seen from the outside. A space is provided inside the container body 100 to be filled with a beverage liquid such as coffee and a high-pressure gas such as nitrogen. And the upper side in the longitudinal direction of the container body 100 is opened.

The lid 200 is formed to close the open upper side of the container body 100. A through hole 202 is formed in the center of the lid 200. The nozzle 300 is formed in a long tube shape along the longitudinal direction and is positioned so as to be movable up and down while being inserted into the through hole 202. And a valve (not shown) is installed at the inner end of the nozzle 300 positioned inside the container body 100.

The valve normally closes the inner end of the nozzle 300. When force is applied to the outer end of the nozzle 300 protruding to the outside of the container body 100 by the pressure by the pressing member 400, the nozzle 300 presses the valve. Upon the nozzle pressing onto the valve, the valve opens and the beverage solution and high-pressure gas inside the container body 100 are discharged to the outside through the nozzle 300. The valve is a known technology; therefore, a more detailed description is not necessary. The cap 150 is coupled to the container body 100 so as to cover the pressing member 400.

Figure 4:
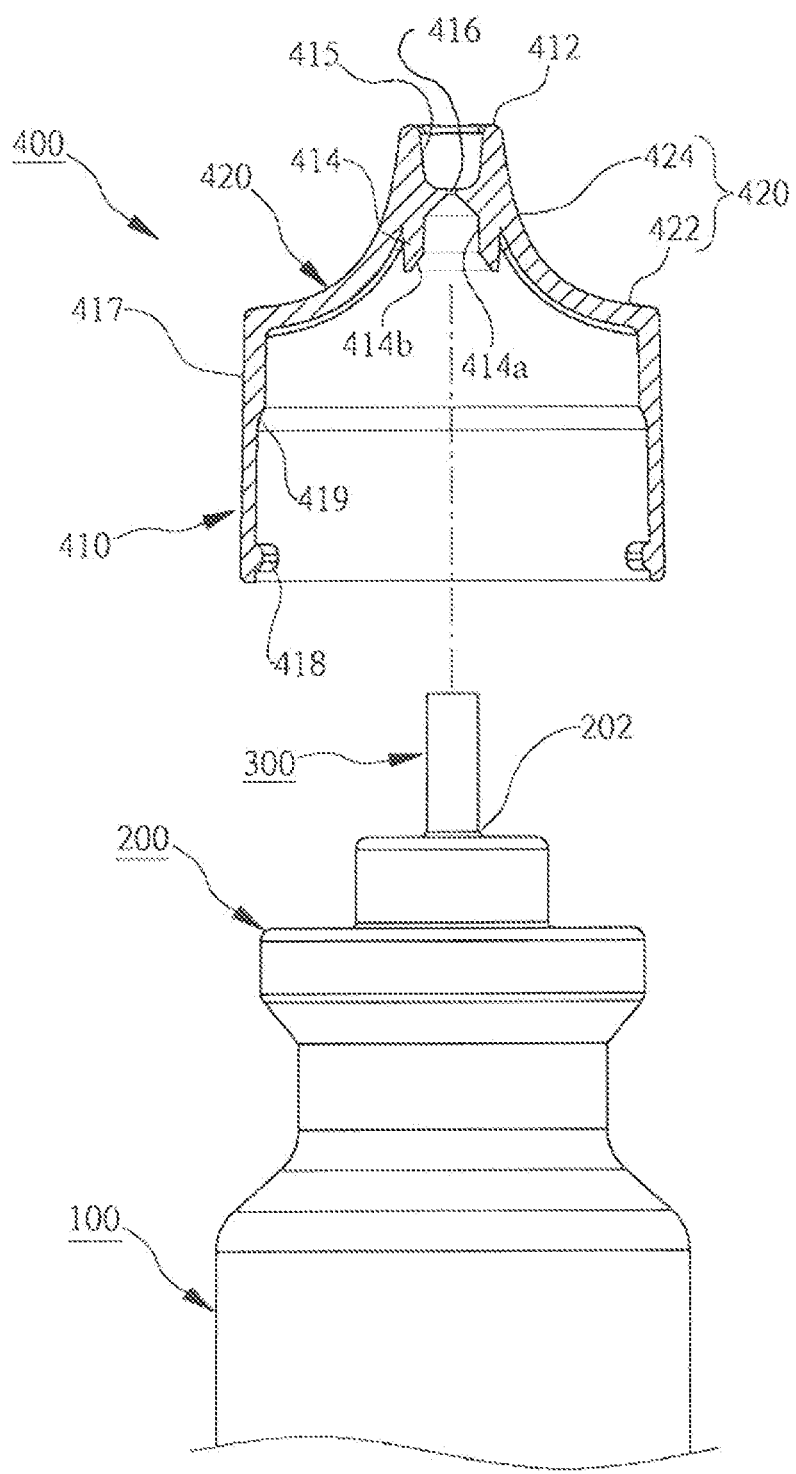
FIG. 4 is a cross-sectional view showing a state in which the pressing member of the nitro beverage container according to a preferred embodiment of the present invention is separated from the container body.
Figure 5:
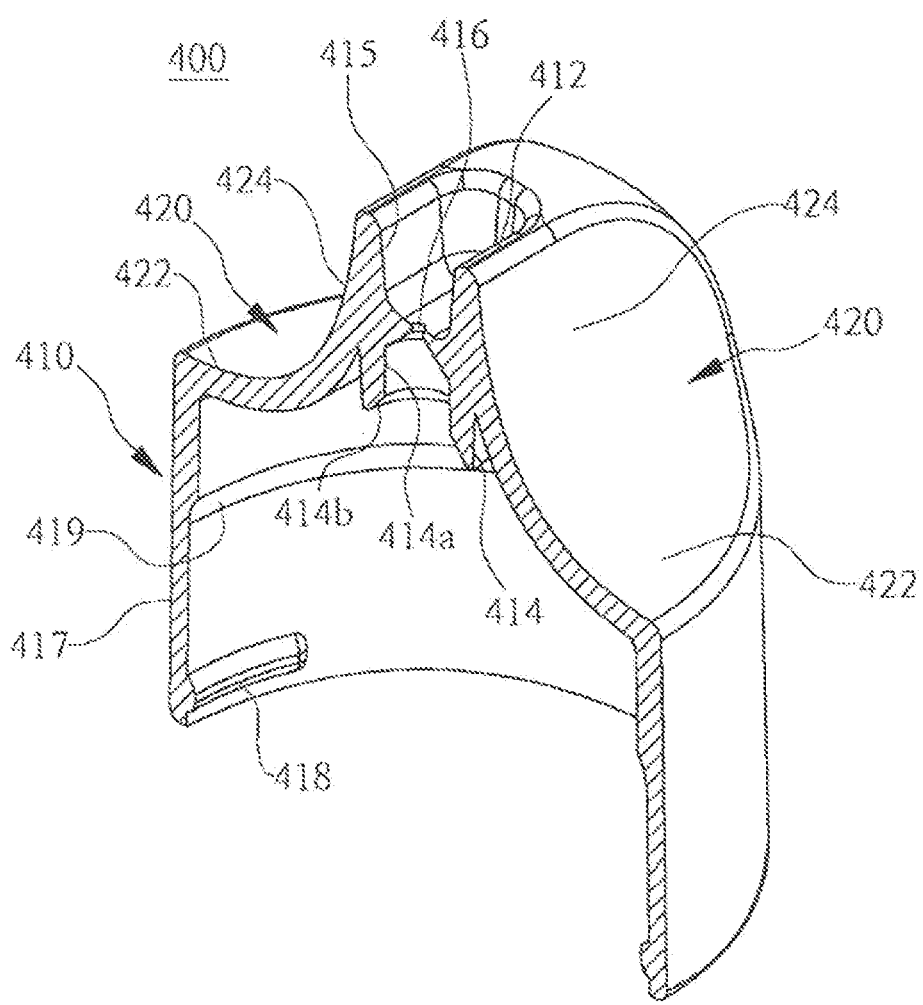
FIG. 5 shows a pressing member of the nitro beverage container.

FIG. 4 is a cross-sectional view showing the pressing member 400 of the nitro beverage container 50 is separated from the container body 100. FIG. 5 shows the pressing member 400 of the nitro beverage container 50.

FIGS. 4 and 5 show the pressing member 400 designed to stably pressing the nozzle 300. The pressing member 400 includes a housing 410 and a pair of guide grooves 420. The housing 410 has a space formed therein so that the lid 200 and the nozzle 300 are accommodated. The housing 410 includes a pressing surface portion 412 positioned in the opposite direction of the lid 200 and a side wall portion 417 formed in a columnar shape along the rim of the pressing surface portion 412. And the lid 200 and the nozzle 300 are accommodated in the inner space between the pressing surface portion 412 and the side wall portion 417.

A convex portion 414 is formed to protrude in the direction of the nozzle 300 at the center of the inner surface of the housing 410 positioned to face the nozzle 300. The guide groove 414a is concavely engaged in the convex portion 414. A discharge hole 416 is formed through the center of the bottom surface of the engaging guide groove 414a. The bottom surface of the engaging guide groove 414a may be formed to gradually decrease in cross-sectional area toward the center.

The discharge hole 416 is formed to have a smaller diameter than the nozzle 300. When the side wall portion 417 is coupled to the lid 200, the outer end of the nozzle 300 is positioned so as to be caught on the edge of the bottom surface of the engaging guide groove 414a in a state inserted into the engaging guide groove 414a. The sliding portion 414b is formed to be inclined along the inner peripheral end of the engaging guide groove 414a facing the lid 200, and the outer end of the nozzle 300 slides along the sliding portion 414b in the direction of the bottom of the engaging-guide groove 414a.

A discharge-guide groove 415 is formed concavely in the direction of the engaging guide groove 414a in the center of the pressing surface portion 412 located in the opposite direction of the nozzle 300. That is, the discharge-guide groove 415 is formed from the pressing surface portion 412 towards the discharge hole 416 located at the center bottom of the discharge-guide groove 415. The discharge hole 416 is also located at the center of the pressing surface portion 412.

The beverage solution and nitrogen gas are discharged from the nozzle 300, through the discharge hole 416. Because the beverage 55 and the nitrogen gas 60 being discharged are guided by the nozzle 300 and by the center of the discharge-guide groove 415 and the discharge hole 416 therein, the beverage and the gas are guidely discharged from the container body 100. The beverage and the gas discharged are guided and uniformly ejected by the pressurized gas from the container body, the beverage is not splattered unnecessarily and retained by the cup.

The guide groove 420 is to guide the placement of the user's finger. The guide groove 420 is configured as a pair and are located in the opposite direction of the lid 200. On two sides between the pressing surface portion 412 and the side wall portion 417 of the housing 410, the guide grooves 420 are concavely formed so that the fingers of the user may be placed upon the guide grooves 420. The guide groove 420 has a first guide part 422 near its adjacent side wall portion 417 and second guide part 424 near its adjacent pressing surface portion 412. The surface of guide groove 420, flowing from the pressing surface portion 412 to the side wall portion 417 form a concave arc shape. The concave arc shape is designed to better accommodate the fingers of the user.

Figure 6:
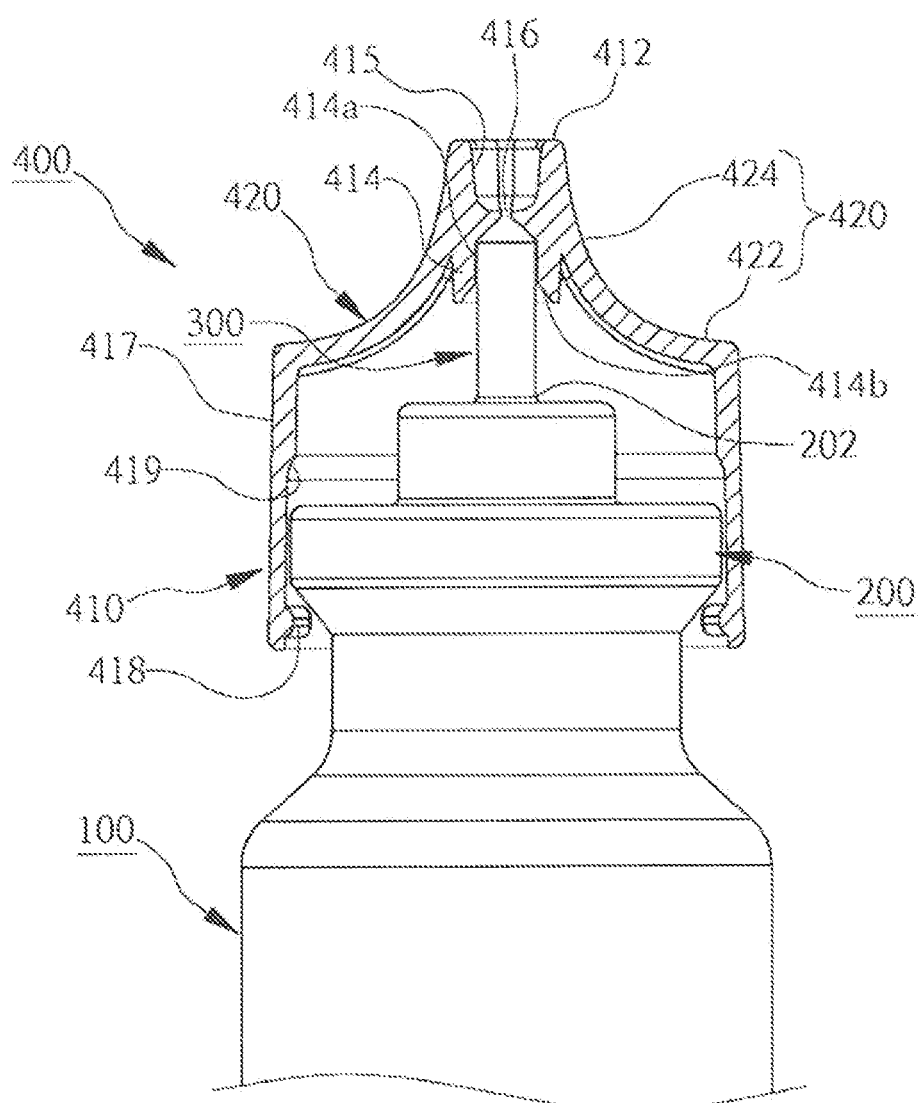
FIG. 6 shows the inner configuration of the nitro beverage container under the pressing member.

For example, when an index and a middle finger of the user are respectively guided to the pair of guide grooves 420, the inner surface of the index finger and the inner surface of the middle finger, facing the palm of the hand, are on the pair of first guide parts 422, respectively. The side of the index finger and the side of the middle finger facing each other are also placed on or near the second guide part 424, respectively. As such, because the fingers are stably mounted on the pair of guide grooves 420, the housing 410 can be stably pressed in the direction of the container body 100 with the pair of fingers. Moreover, because the guide groove 420 is configured not to protrude from both sides of the container body 100, it has excellent portability. FIG. 6 is a cross-sectional view showing the pressing member 400 of the nitro beverage container 50, coupled to the container body 100. The lid 200 is inserted into the lower end of the side wall portion 417, and the pressing member 400 is coupled to the container body 100.

The locking portion 418 is formed to protrude from the lower end of the inner periphery of the side wall portion 417 located in the opposite direction of the pressing surface portion 412. The lid 200 is hooked on the locking portion 418 to be securely attached.

The nozzle 300 is inserted into the engaging guide groove 414a. And a stopper 419 is formed to protrude from the lower end of the inner periphery of the side wall portion 417 in a position spaced apart in the direction of the pressing surface portion 412. Accordingly, when external pressure is applied to the guide groove 420 and the pressing member 400 is moves downward, the stopper 419 is moved into the lid 200 direction so as to be closer to the lid 200. The upper surface of the lid 200 engaging the stopper 419 limits the downward movement of the pressing member 400.

When the external pressure applied to the guide groove 420 is removed, the pressing member 400 moves upward and the lid 200 is again catches the locking portion 418. Because the lid 200 is caught between the locking portion 418 and the stopper 419, the pressing member 400 may not arbitrarily removed from the container body 100. Thus, the pressing member 400 is an integral part of the container 50, and there is no need to carry it separately or be stored away separately.

Figure 7:
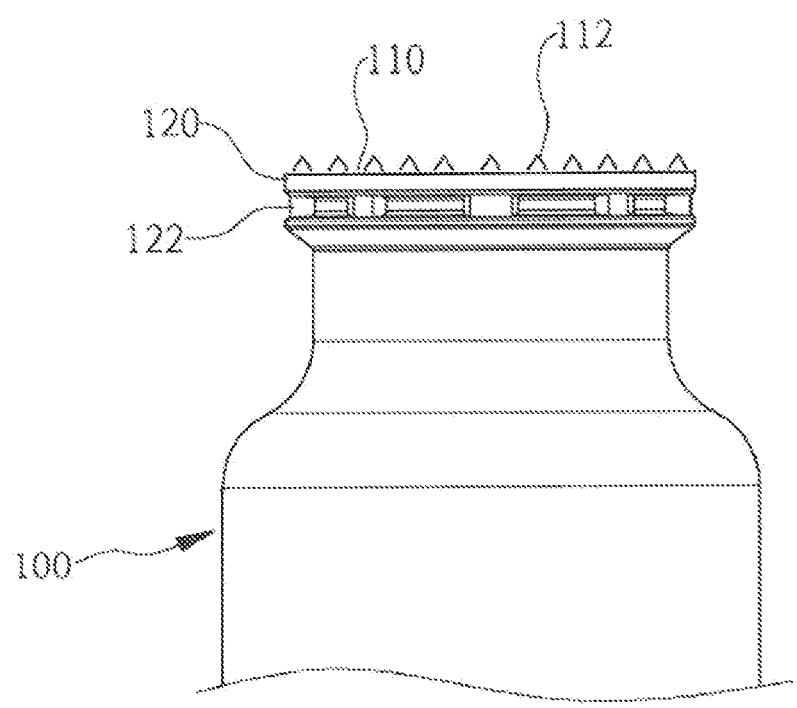
FIG. 7 is a view of the upper portion of the container body.

FIG. 7 is a cross-sectional view of the container body 100 of the nitro beverage container 50. As shown in FIG. 6 one end of the container body 100 closed by the lid 200. Under the lid 200, as shown in FIG. 7, a container top 110 located at a longitudinal end of the container body 100 facing the guide grooves 420. The container side part 120 is also located on the longitudinal side of the container body 100 and is connected to the edge of the container top 110. A plurality of fastening protrusions 112 are formed to protrude along the circumference of the container top 110. A plurality of binding grooves 122 are concavely formed along the outer periphery of the container side part 120. The fastening protrusion 112 may also be formed in a triangular shape such that the tip is pointed.

The inside of the lid 200 covering the container wall 110 is formed to cover the inner skin (not shown) of an elastic material, so that the inside of the lid 200 is at the longitudinal end of the container body 100. When coupled with the lid 200, the fastening protrusion 112 is positioned so as to be embedded in the inner skin of the lid 200. The inner skin may be made of, for example, silicone. Also, the inside of the lid 200 is coupled to cover the longitudinal side of the container body 100. The inside of the lid 200 has binding protrusions (not shown) and when lid 200 caps the container body 100, the binding protrusions (not shown) of the lid at the inner walls of the lid are fit into the binding grooves 122. Because the fastening protrusions 112 are configured to be firmly embedded in the inner skin and the binding protrusions are inserted into the binding grooves 122, the lid 200 is firmly and tightly coupled to the container body 100. Because of the secure enclosures, high-pressure gas accommodated in the body 100 is safely stored along with the beverage. Because of multiple interlocking enclosure functions, the container body 100 could handle the pressure as the pressure of the gas inside the container body 100 increases even at elevated temperatures, accommodating the high temperature of the summer season.

FIGS. 8A and 8B illustrate a process in which a liquid beverage and a high-pressure gas are discharged from a nitro beverage container 50. FIG. 8A is an illustration of the nitro beverage container 50 held in a hand prior to discharge of liquid and gas. FIG. 8B is an illustration of the nitro beverage container 50 squirting liquid and gas as the pressing member is pressed toward the container body by the fingers.

FIG. 8A shows the pressing member 400 located at the lower portion and the container body 100 with the user holds the container 50 with a thumb on the upper end of the container body 100 and the index finger and middle finger on the pair of guide grooves 420, respectively. The cup 3 is positioned under the pressing member 400 to receive the beverage and the gas from the container 50. The cup 3 may have water in it before the beverage is ejected into it.

FIG. 8B shows the user pressing the thumb downward and the index finger and middle finger held in place (or toward the thumb). The pressing member 400 moves toward the container body 100. As the pressing member 400 moves upward, the nozzle 300 is pressed by the force applied by the fingers and the thumb, the nozzle 300 opens the valve. As the valve is opened, the beverages, such as coffee, and high-pressure gas, such as nitrogen, contained in the container body 100 are discharged in the direction of the cup 3 through the discharge hole 416.

While the description, drawings, and references have presented, shown, and described with reference to different embodiments thereof, it goes without saying that the present disclosure is not limited thereto, and it is apparent to those skilled in the art that various changes and modifications are possible within the scope of the technical spirit of the present disclosure. If it falls within the scope of the claims, the technical idea should be regarded as belonging to the rights claimed herein.

What is claimed is:

1. A container for beverage, comprising a container body and a pressing member attached to the container body,
   wherein the container body has a nozzle,
   wherein the pressing member has a pair of guide grooves concavely formed to guide user's fingers on two sides of the outer surface of the pressing member, and wherein the pressing member has a discharge hole positioned facing the nozzle so that the beverage contained in the container discharges through the nozzle and through the discharge hole when the pressing member is pressed towards the container body,
   wherein the container body has a lid enclosing the container body, and wherein the pressing member has a housing to accept the lid and the nozzle,
   wherein the discharge hole has smaller diameter than the nozzle, wherein the pressing member further comprises an engaging guide groove receiving the nozzle when the pressing member is pressed against the container body,
   wherein the pressing member further comprises a sliding part that slidably guides the nozzle into the engaging guide groove when the pressing member is pressed against the container body,
   wherein the pressing member further comprises a stopper to limit the movement of the nozzle into an engaging groove,
   wherein the pressing member further comprises a pressing surface portion having a discharge-guide groove formed from the pressing surface portion towards the discharge hole located at the bottom of the discharge-guide groove, and
   wherein the container body further comprises a container side part located on a longitudinal side of the container body and is connected to the edge of the container top, and wherein a plurality of fastening protrusions is formed to protrude along the circumference of the container top.

2. The container for beverage of claim 1, wherein the container body further comprise a plurality of binding grooves concavely formed along the outer periphery of the container side part, wherein the plurality of fastening protrusions is formed in triangular shape, and wherein the container further comprises a cap fitting over the pressing member.

3. The container for beverage of claim 2, wherein the beverage is coffee contained in the container body, and wherein the container body also contains pressurized gas.

4. A container for beverage, comprising a container body and a pressing member attached to the container body,
   wherein the container body has a nozzle protruding from the container body,
   wherein the pressing member has a pair of guide grooves concavely formed to guide user's fingers on two sides of the outer surface of the pressing member, wherein each of the guide groove has a first guide part and a second guide part so that one of the fingers is placed on between the first guide part and the second guide part,
   wherein the pressing member has a discharge hole located between the pair of guide grooves and positioned facing the nozzle so that the beverage contained in the container discharges through the nozzle and through the discharge hole when the pressing member is pressed towards the container body,
   wherein the container body has a lid enclosing the container body, and wherein the pressing member has a housing to accept the lid and the nozzle,
   wherein the discharge hole has smaller diameter than the nozzle,
   wherein the pressing member further comprises an engaging guide groove receiving the nozzle when the pressing member is pressed against the container body,
   wherein the pressing member further comprises a sliding part that slidably guides the nozzle into the engaging guide groove when the pressing member is pressed against the container body,
   wherein the pressing member further comprises a stopper to limit the movement of the nozzle into an engaging groove,
   wherein the pressing member further comprises a pressing surface portion having a discharge-guide groove formed from the pressing surface portion towards the discharge hole located at the bottom of the discharge-guide groove, and
   wherein the container body further comprises a container side part located on a longitudinal side of the container body and is connected to the edge of the container top, and wherein a plurality of fastening protrusions is formed to protrude along the circumference of the container top.

5. The container for beverage of claim 4, wherein the container body further comprises a plurality of binding grooves concavely formed along the outer periphery of the container side part, wherein the plurality of fastening protrusions is formed in triangular shape, and wherein the container further comprises of a cap fitting over the pressing member.

6. The container for beverage of claim 5, wherein the beverage is coffee contained in the container body, and wherein the container body also contains pressurized gas.

* * * * *